(12) United States Patent
Ciano et al.

(10) Patent No.: US 7,506,037 B1
(45) Date of Patent: Mar. 17, 2009

(54) METHOD DETERMINING WHETHER TO SEEK OPERATOR ASSISTANCE FOR INCOMPATIBLE VIRTUAL ENVIRONMENT MIGRATION

(75) Inventors: Giuseppe Ciano, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/119,726

(22) Filed: May 13, 2008

(51) Int. Cl.
*G06F 15/177* (2006.01)
(52) U.S. Cl. ...................... 709/220; 709/221
(58) Field of Classification Search ................. 709/220, 709/221, 238, 201; 718/1; 707/204; 711/154, 711/162
See application file for complete search history.

(56) References Cited

U.S. PATENT DOCUMENTS

| | | | |
|---|---|---|---|
| 7,356,679 B1 | 4/2008 | Le et al. | |
| 7,383,405 B2* | 6/2008 | Vega et al. | 711/162 |
| 2003/0191911 A1* | 10/2003 | Kleinschnitz et al. | 711/154 |
| 2006/0005189 A1* | 1/2006 | Vega et al. | 718/1 |
| 2006/0010176 A1* | 1/2006 | Armington | 707/204 |
| 2006/0015646 A1* | 1/2006 | Ogilvy | 709/238 |
| 2006/0085784 A1 | 4/2006 | Traut et al. | |
| 2007/0168478 A1* | 7/2007 | Crosbie | 709/221 |
| 2008/0086616 A1 | 4/2008 | Asano et al. | |
| 2008/0183799 A1* | 7/2008 | Bobroff et al. | 709/201 |
| 2008/0244569 A1* | 10/2008 | Challener et al. | 718/1 |

\* cited by examiner

*Primary Examiner*—Le Luu
(74) *Attorney, Agent, or Firm*—King & Spalding LLP

(57) ABSTRACT

An incompatibility problem during a virtual environment migration from a first host to a second host can be addressed by changing a configuration of the virtual environment and/or by migrating the virtual environment to a host other than the second host. A migration advisor module is configured to take such action automatically upon detection of the incompatibility problem. Alternatively, the migration advisor module may take such action with assistance and/or input from an operator. The migration advisor module can change the configuration of the virtual environment by removing unnecessary components of the virtual environment and causing the reconfigured virtual environment to be migrated to the second host. Alternatively, the migration advisor module can cause the virtual environment to be migrated to a third host with sufficient physical system resources to meet the requirements of the virtual environment.

1 Claim, 5 Drawing Sheets

METHOD DETERMINING WHETHER TO SEEK OPERATOR ASSISTANCE FOR INCOMPATIBLE VIRTUAL ENVIRONMENT MIGRATION

TECHNICAL FIELD

The present disclosure relates generally to a method and system for virtual environment migration, and more particularly, to a method and system for providing solutions to incompatibility problems during virtual environment migration.

BACKGROUND

A virtual environment is a software implementation of a computer-based environment that operates like a real computer-based environment. One example of a virtual environment is a virtual machine, which is a software implementation of a computer that operates like a real computer. Emerging virtualization technologies offer the possibility of migrating a virtual environment from one physical system to another physical system without stopping or suspending operation of the virtual environment.

This migration is sometimes called "dynamic migration." The terms "migrate" and "migration" are used interchangeably herein to refer to moving and relocating an item from one location to another location. Migration may occur in an automated fashion or via operator assistance. For example, automated migration may be used in load balancing and/or workload distribution scenarios.

Physical systems have configurations that may or may not be compatible with the requirements of certain virtual environments. For example, a virtual environment may require a different configuration of input/output ("I/O") devices than are available on a target physical system. The virtual environment also may require more or different central processing unit ("CPU") resources, memory, and/or processors than are available on the target physical system. For example, a physical system that only has 1 CPU is not compatible with a virtual environment that requires 3 CPU.

Traditionally, a migration could not be completed if there was any inconsistency between physical system resources and virtual environment requirements. The migration was stopped upon detection of such an inconsistency, leaving an operator to determine the reason why the migration stopped and whether and how the migration could be completed. For example, the operator could modify certain features of the virtual environment or physical system to allow the migration to be completed. Once the operator made this modification, the operator had to repeat the whole migration process again. This process is cumbersome and time-consuming.

Therefore, a need exists in the art for an improved method and system for virtual environment migration. In addition, a need exists in the art for such a system and method to provide efficient, user-friendly solutions to problems of incompatibility during virtual environment migration.

SUMMARY

The invention provides a method and system for virtual environment migration. In particular, the invention provides a method and system for providing solutions to incompatibility problems during virtual environment migration. A migration advisor module is coupled to multiple virtual environment hosts via a network.

The migration advisor module is configured to receive information regarding a request to migrate a virtual environment ("VE") from a first host to a second host. The migration advisor module can determine whether the VE is compatible with the second host by comparing available physical system resources of the second host with physical system requirements of the VE. The migration advisor module may determine that the VE is incompatible with the second host if the available physical system resources of the second host do not meet at least one of the physical system requirements of the VE.

The migration advisor module can determine whether to seek operator assistance to address the incompatibility. For example, the migration advisor module can make this determination based on one or more rules. If the migration advisor module determines not to seek operator assistance, the migration advisor module can automatically address the incompatibility based on one or more rules. For example, the migration advisor module can address the incompatibility by automatically causing the VE to be migrated to a third host that is not the second host, and/or by automatically reconfiguring the VE for successful migration to the second host. The migration advisor module may reconfigure the VE by removing at least one unnecessary component from the VE.

If the migration advisor module determines to seek operator assistance, the migration advisor module can output at least one request to an operator for an instruction on how to address the incompatibility. For example, the request(s) can be displayed in a browser application, software application window, and/or software "wizard" screen. The migration advisor module can read at least one instruction provided by the operator in response to the request(s) and address the incompatibility based on the instruction(s). For example, the migration advisor module can address the incompatibility by causing the VE to be migrated to a third host that is not the second host, and/or by reconfiguring the VE for successful migration to the second host. These steps may be performed with assistance and/or input from the operator.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

FIG. 4, comprising

DETAILED DESCRIPTION OF EXEMPLARY EMBODIMENTS

The invention is directed to a method and system for virtual environment migration. In particular, the invention provides a method and system for providing solutions to incompatibility problems during virtual environment migration. For example, such migration may be dynamic virtual environment migration.

Turning now to the drawings, in which like numerals indicate like elements throughout the figures, exemplary embodiments of the invention are described in detail.

Figure 1:
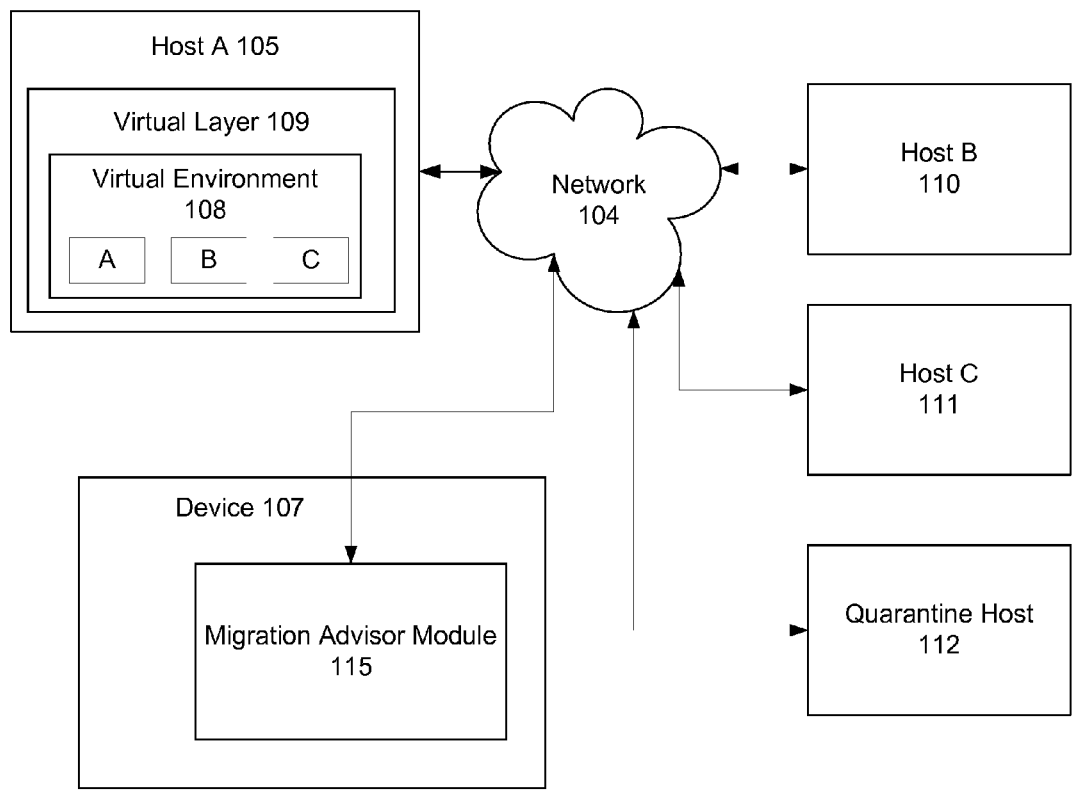
FIG. 1 is a block diagram depicting an exemplary operating environment for implementation of certain exemplary embodiments.

FIG. 1 is a block diagram depicting an exemplary operating environment 100 for implementation of certain exemplary embodiments of the invention. Network devices 105, 107, and 110-112 are interconnected via a network 104. The network 104 includes a wired or wireless telecommunication means by which network devices 105, 107, and 110-112 can exchange data. For example, the network 104 can include a local area network ("LAN"), a wide area network ("WAN"), an intranet, an Internet, or any combination thereof. The terms "data" and "information" are used interchangeably herein to refer to text, images, audio, video, or any other form of information that can exist in a computer-based environment, whether readable by a computer or a person.

Each network device 105, 107, and 110-112 can be any device capable of transmitting and receiving data over the network 104. For example, each network device 105, 107, and 110-112 can be a server, a dedicated storage device, a desktop computer, a laptop computer, a wireless network device, such as a personal digital assistant (PDA), a handheld computer, or any other wired or wireless, processor-driven device.

Figure 2:
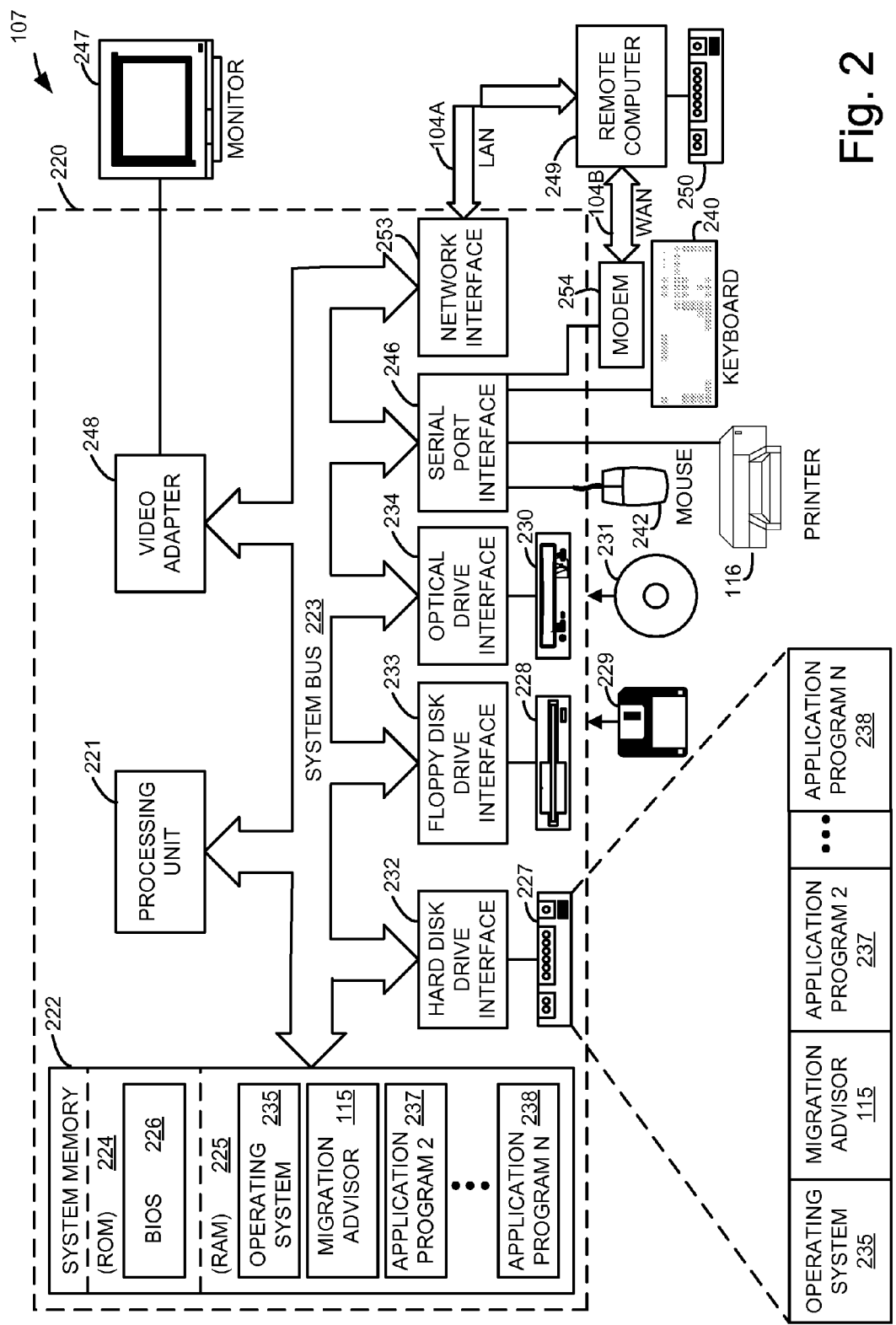
FIG. 2 is a block diagram illustrating a general component architecture for a network device constructed in accordance with certain exemplary embodiments.

FIG. 2 is a block diagram illustrating a general component architecture for the network device 107, in accordance with certain exemplary embodiments. The network device 107 includes a general-purpose computing device in the form of a conventional computer 220. Generally, the computer 220 includes a processing unit 221, a system memory 222, and a system bus 223 that couples various system components, including the system memory 222, to the processing unit 221. The system bus 223 can include any of several types of bus structures, including a memory bus or memory controller, a peripheral bus, or a local bus, using any of a variety of bus architectures. The system memory 222 includes a read-only memory ("ROM") 224 and a random access memory ("RAM") 225. A basic input/output system (BIOS) 226 containing the basic routines that help to transfer information between elements within the computer 220, such as during start-up, is stored in the ROM 224.

The computer 220 also includes a hard disk drive 227 for reading from and writing to a hard disk (not shown), a magnetic disk drive 228 for reading from or writing to a removable magnetic disk 229 such as a floppy disk, and an optical disk drive 230 for reading from or writing to a removable optical disk 231 such as a CD-ROM, compact disk-read/write (CD/RW), DVD, or other optical media. The hard disk drive 227, magnetic disk drive 228, and optical disk drive 230 are connected to the system bus 223 by a hard disk drive interface 232, a magnetic disk drive interface 233, and an optical disk drive interface 234, respectively. Although the exemplary network device 107 employs a ROM 224, a RAM 225, a hard disk drive 227, a removable magnetic disk 229, and a removable optical disk 231, it should be appreciated by a person of ordinary skill in the art having the benefit of the present disclosure that other types of computer readable media also can be used in the exemplary network device 107. For example, the computer readable media can include any apparatus that can contain, store, communicate, propagate, or transport data for use by or in connection with one or more components of the computer 220, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer readable media can provide nonvolatile storage of computer-executable instructions, data structures, program modules, and other data for the computer 220.

A number of modules can be stored on the ROM 224, RAM 225, hard disk drive 227, magnetic disk 229, or optical disk 231, including an operating system 235 and various application modules 115, 237-238. Application modules 115, 237-238 can include routines, sub-routines, programs, objects, components, data structures, etc., which perform particular tasks or implement particular abstract data types. Application module 115, referred to herein as a "migration advisor module" 115, is discussed in more detail below, with reference to FIGS. 3-4.

A user can enter commands and information to the computer 220 through input devices, such as a keyboard 240 and a pointing device 242. The pointing device 242 can include a mouse, a trackball, an electronic pen that can be used in conjunction with an electronic tablet, or any other input device known to a person of ordinary skill in the art, such as a microphone, joystick, game pad, satellite dish, scanner, or the like. These and other input devices are often connected to the processing unit 222 through a serial port interface 246 that is coupled to the system bus 223, but can be connected by other interfaces, such as a parallel port, game port, a universal serial bus (USB), or the like. A display device 247, such as a monitor, also can be connected to system bus 223 via an interface, such as a video adapter 248. In addition to the display device 247, the computer 220 can include other peripheral output devices, such as speakers (not shown) and a printer 116.

The computer 220 is configured to operate in a networked environment using logical connections to one or more remote computers 249, such as network devices 105 and 110-112. The remote computer 249 can be any network device, such as a personal computer, a server, a client, a router, a network PC, a peer device, or other device. While the remote computer 249 typically includes many or all of the elements described above relative to the computer 220, only a memory storage device 250 has been illustrated in FIG. 2 for simplicity. The logical connections depicted in FIG. 2 include a LAN 104A and a WAN 104B. Such networking environments are commonplace in offices, enterprise-wide computer networks, intranets, and the Internet.

When used in a LAN networking environment, the computer 220 is often connected to the LAN 104A through a network interface or adapter 253. When used in a WAN networking environment, the computer 220 typically includes a modem 254 or other means for establishing communications over the WAN 104B, such as the Internet. The modem 254, which can be internal or external, is connected to system bus 223 via a serial port interface 246. In a networked environment, program modules depicted relative to computer 220, or portions thereof, can be stored in the remote memory storage device 250.

It will be appreciated that the network connections shown are exemplary and other means of establishing a communications link between the computers can be used. Moreover, those skilled in the art will appreciate that the network device 107 illustrated in FIG. 2 can have any of several other suitable computer system configurations. For example, the network device 107 may not include certain components, in alternative exemplary embodiments. In certain exemplary embodiments, each of the network devices 105 and 110-112 can include a structure similar to that described previously in connection with the network device 107.

The operating environment 100 and network devices 105, 107, and 110-112 are described hereinafter with reference to the methods illustrated in FIGS. 3-4.

Figure 3:
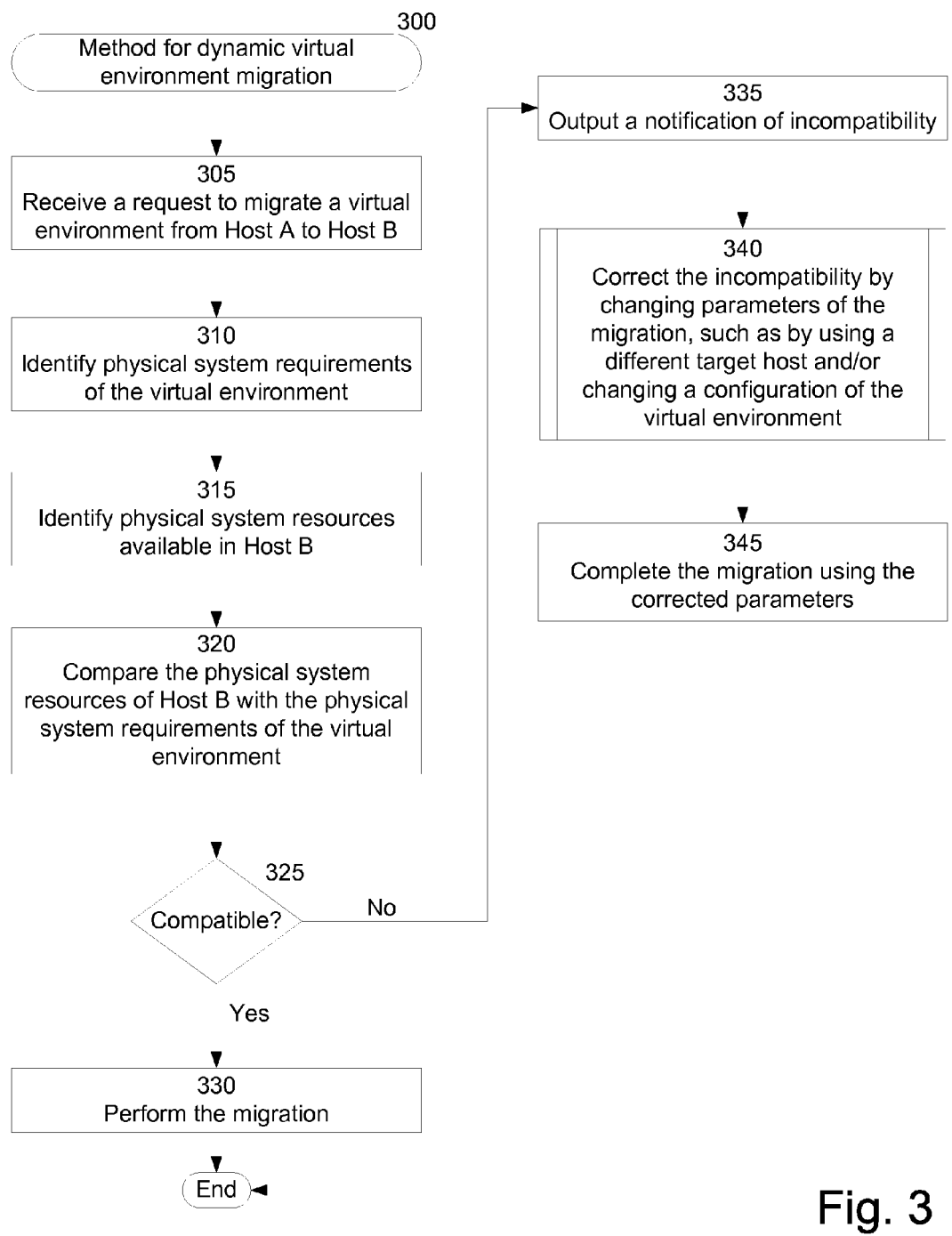
FIG. 3 is a flow chart depicting a method for dynamic virtual environment migration, in accordance with certain exemplary embodiments.

FIG. 3 is a flow chart depicting a method 300 for dynamic virtual environment migration, in accordance with certain exemplary embodiments. The exemplary method 300 is illustrative and, in alternative embodiments of the invention, certain steps can be performed in a different order, in parallel with one another, or omitted entirely, and/or certain additional steps can be performed without departing from the scope and spirit of the invention. The method 300 is described hereinafter with reference to FIGS. 1-3.

In step 305, the migration advisor module 115 receives a request to migrate a virtual environment 108 from the network device 105 ("Host A") to the network device 110 ("Host B"). In certain exemplary embodiments, the migration advisor module 115 can receive the request via the network 104 (from another device) or via one or more input devices, such as the pointing device 242 and/or keyboard 240. For example, the migration advisor module 115 can receive the request via a browser application or "wizard" displayed to an operator of one or more of the network devices 105, 107, and 110-112. By way of example only, the migration advisor module 115 can receive the request in response to a "drag and drop" operation in which the operator selects an icon or other item associated with the virtual environment 108 in a first window or folder associated with Host A 105, drags the icon or other item to a second window or folder associated with Host B, and drops the icon or other item in the second window or folder.

In certain exemplary embodiments, some or all of the functionality of the migration advisor module 115 may be implemented as a "plug-in" to an existing virtual environment manager, such as the VMware brand Virtual Center. For example, the migration advisor module 115 can be configured to interact with one or more browser applications or wizards provided by the existing virtual environment manager. Alternatively, the migration advisor module 115 may be implemented as a stand-alone software application. Although FIGS. 1-2 illustrate the migration advisor module 115 as a component of a network device 107 separate from the network devices 105 and 110-112, a person of ordinary skill in the art having the benefit of the present disclosure will recognize that the migration advisor 115 may be a component of one of the network devices 105 and 110-112, in certain alternative exemplary embodiments.

The virtual environment 108 operates in a virtual layer 109 of Host A 105. The virtual layer 109 is a software layer providing virtualization for the virtual environment 108. The virtual environment 108 includes multiple components A-C. Each component A-C is a piece of software that requires certain physical system resources and/or a certain physical system configuration.

In step 310, the migration advisor module 115 identifies physical system requirements of the virtual environment 108, including physical system requirements of each component A-C of the virtual environment 108. For example, each component A-C may require a certain configuration of I/O devices and a certain amount and/or configuration of CPU resources, memory, network interface, disk drive, and/or processors. In certain exemplary embodiments, the migration advisor module 115 includes one or more data collector components (not shown) configured to collect information related to the requirements of each component A-C from a data repository, such as a database (not shown), associated or incorporated with one or more of the network devices 105, 107, and 110-112.

In step 315, the migration advisor module 115 identifies the physical system resources available in Host B 110, including information related to the system configuration of Host B 110 and/or information related to levels of available resources of Host B 110. For example, the migration advisor module 115 (and/or one or more data collector components thereof) can collect this information from a data repository, such as a database, associated or incorporated with one or more of the network devices 105, 107, and 110-112.

In step 320, the migration advisor module 115 compares the physical system resources of Host B 110 with the physical system requirements of the virtual environment 108. In step 325, the migration advisor module 115 determines whether the physical system resources of Host B 110 are compatible with the physical system requirements of the virtual environment 108. For example, the resources and requirements may not be compatible if the virtual environment 108 requires more resources and/or a different resource configuration than Host B 110 has available. If the migration advisor module 115 determines in step 325 that the physical system resources of Host B 110 are compatible with the physical system requirements of the virtual environment 108, then the method 300 continues to step 330, where the migration of the virtual environment 108 from Host A 105 to Host B 110 is performed.

If the migration advisor module 115 determines in step 325 that the physical system resources of Host B 110 are not compatible with the physical system requirements of the virtual environment 108, then the method 300 branches to step 335. In step 335, the migration advisor module 115 outputs a notification of incompatibility. For example, the migration advisor module 115 can output a visual, tactile, or auditory notification to an operator of the incompatibility. The notification can include information about the incompatibility, such as a reason for the incompatibility. For example, the notification can include an icon depicting a CPU, memory, network interface, disk drive, and/or processor with an "X" through it, indicating that the CPU, memory, network interface, disk drive, and/or processor resources of Host B 110 are not compatible with the physical system requirements of the virtual environment 108. In certain exemplary embodiments, the notification can be displayed in a browser application or software application window associated with the migration advisor module 115 and/or the operator.

In step 340, the migration advisor module 115 corrects the incompatibility by changing parameters of the migration, such as by using a different target host and/or by changing a configuration of the virtual environment 108. The migration advisor module 115 may correct the incompatibility automatically or with at least some assistance from the operator. Step 340 is described hereinafter with reference to FIG. 4.

In step 345, the migration is completed using the corrected parameters from step 340. For example, the migration advisor module 115 or another associated software module (not shown) may perform the migration in accordance with procedures known to a person of ordinary skill in the art having the benefit of the present disclosure.

Figure 4A:
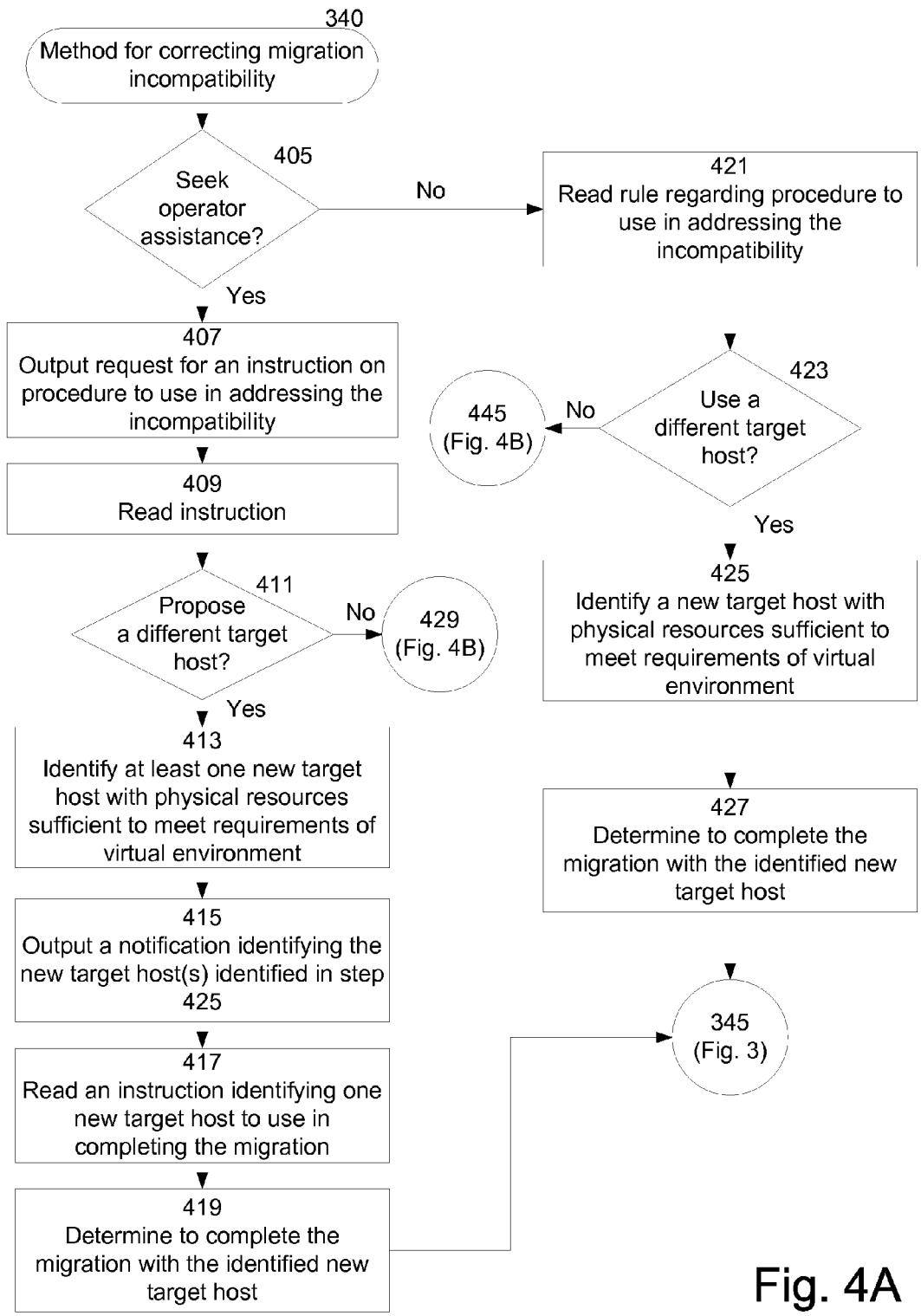
FIGS. 4A and 4B, is a flow chart depicting a method for correcting migration incompatibility, in accordance with certain exemplary embodiments.
Figure 4B:
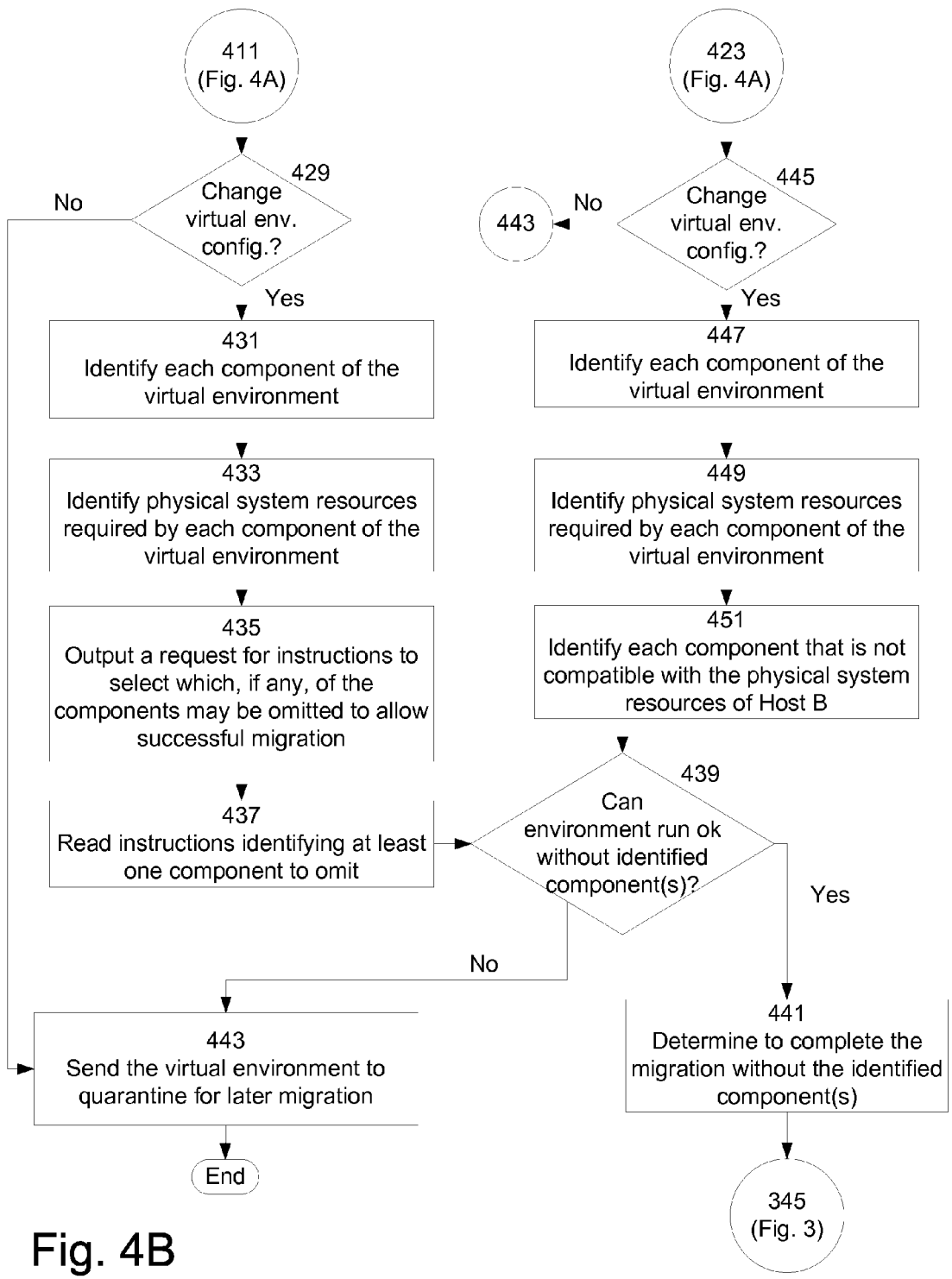

FIG. 4, comprising FIGS. 4A and 4B, is a flow chart depicting a method 340 for correcting migration incompatibility, in accordance with certain exemplary embodiments, as referred to in step 340 of FIG. 3. The exemplary method 340 is illustrative and, in alternative embodiments of the invention, certain steps can be performed in a different order, in parallel with one another, or omitted entirely, and/or certain additional steps can be performed without departing from the scope and spirit of the invention. The method 340 is described below with reference to FIGS. 1-4.

In step 405, the migration advisor module 115 determines whether to seek operator assistance. In certain exemplary embodiments, the migration advisor module 115 can make this determination based on one or more rules associated with the operator, the virtual environment 108, the migration advisor module 115, Host A 105, and/or Host B 110. For example, a rule can indicate that, for certain virtual environments 108, operator assistance is desired. If the migration advisor module 115 determines in step 405 to seek operator assistance, the method 340 continues to step 407.

In step 407, the migration advisor module 115 outputs a request for an instruction on what procedure to use in correcting the migration incompatibility. For example, the procedure can include using a different target host than Host B 110 and/or changing a configuration of the virtual environment 108. In certain exemplary embodiments, the migration advisor module 115 can output the request to an operator via a browser application or software application window associated with the migration advisor module 115 and/or the operator. For example, in step 407, the migration advisor module 115 can initiate a wizard application that includes the request.

In step 409, the migration advisor module 115 reads an instruction responsive to the request of step 407. The instruction includes information regarding the procedure to use in correcting the migration incompatibility. In certain exemplary embodiments, the migration advisor module 115 may receive the instruction via a browser application or software application window associated with the migration advisor module 115 and/or the operator. For example, the migration advisor module 115 can receive the instruction from a wizard application that includes one or more input fields and/or selectable items, such as text boxes, check boxes, and/or hyperlinks.

In step 411, the migration advisor module 115 determines, based on the instruction received in step 409, whether to correct the migration incompatibility by proposing a different target host than Host B 110. If so, the method 340 continues to step 413. In step 413, the migration advisor module 115 identifies at least one new target host, such as Host C 111, with physical resources sufficient to meet the requirements of the virtual environment 108. Each new target host can be any device or system configured to support a virtual environment. For example, each new target host can be a network device having a configuration similar to one or more of the network devices 105, 107, and 110-112. In certain exemplary embodiments, the migration advisor module 115 can identify the new target host(s) based on information from a data repository, such as a database, associated or incorporated with one or more of the network devices 105, 107, and 110-112, and/or other devices, such as the new target host, coupled to the migration advisor module 115 directly or via the network 104.

In step 415, the migration advisor module 115 outputs a notification that identifies the new target host. In certain exemplary embodiments, the migration advisor module 115 can output the notification to the operator via a browser application or software application window associated with the migration advisor module 115 and/or the operator. For example, the migration advisor module 115 can output the notification in a wizard application that includes information related to the new target host(s). In certain exemplary embodiments, the browser application, software application window, or wizard application can include one or more selectable items and/or input fields associated with the target host(s).

In step 417, the migration advisor module 115 reads an instruction responsive to the notification of step 415. The instruction includes information identifying a new target host to use to complete migration of the virtual environment 108. In certain exemplary embodiments, the migration advisor module 115 may receive the instruction via a browser application or software application window associated with the migration advisor module 115 and/or the operator. For example, the migration advisor module 115 can receive the instruction from a wizard application that includes one or more input fields and/or selectable items, such as text boxes, check boxes, and/or hyperlinks.

In step 419, the migration advisor module 115 determines to complete the migration of the virtual environment 108 by migrating the virtual environment 108 from Host A 105 to the new target host identified in step 417. The method 340 continues to step 345 of FIG. 3.

If the migration advisor module 115 determines in step 411 not to correct the migration incompatibility by proposing a different target host than Host B 110, the method 340 branches to step 429. In step 429, the migration advisor module 115 determines whether to correct the migration incompatibility by changing a configuration of the virtual environment 108. If so, the method 340 continues to step 431.

In step 431, the migration advisor module 115 identifies each component A-C of the virtual environment 108. For example, the migration advisor module 115 (and/or one or more data collector components thereof) can identify the components A-C based on information from a data repository, such as a database, associated or incorporated with one or more of the network devices 105, 107, and 110-112. In step 433, the migration advisor module 115 identifies the physical system resources required by each component A-C of the virtual environment 108. For example, the migration advisor module 115 (and/or one or more data collector components thereof) can identify the physical system resources required by each component A-C based on information from a data repository, such as a database, associated or incorporated with one or more of the network devices 105, 107, and 110-112.

In step 435, the migration advisor module 115 outputs a request to select which, if any, of the components A-C may be omitted to allow successful migration. In certain exemplary embodiments, the migration advisor module 115 can output the request to the operator via a browser application or software application window associated with the migration advisor module 115 and/or the operator. For example, the migration advisor module 115 can output the request in a wizard application that includes information identifying the components A-C, the physical system resources required by each component A-C, and the relative importance of each component to the performance of the virtual environment 108. In certain exemplary embodiments, the browser application, software application window, or wizard application can include one or more selectable items and/or input fields associated with the components A-C.

In step 437, the migration advisor module 115 reads a response to the request of step 435. The response includes information identifying at least one component A-C that may be omitted to allow successful migration. In certain exemplary embodiments, the migration advisor module 115 may receive the response via a browser application or software application window associated with the migration advisor module 115 and/or the operator. For example, the migration advisor module 115 can receive the response from a wizard application that includes one or more input fields and/or selectable items, such as text boxes, check boxes, and/or hyperlinks.

In step 439, the migration advisor module 115 determines whether the virtual environment 108 can run ok without the component(s) A-C identified in step 437. For example, the migration advisor module 115 can make this determination based on the relative importance of the identified component(s) A-C to the performance of the virtual environment 108. If the migration advisor module 115 determines in step 439 that the virtual environment 108 can run ok without the component(s) A-C, the method 340 continues to step 441. In step 441, the migration advisor module 115 determines to complete the migration of the virtual environment without the component(s) A-C identified in step 437. The method 340 continues to step 345 of FIG. 3.

If the migration advisor module 115 determines in step 439 that the virtual environment 108 cannot run ok without the component(s) A-C, the method 340 continues to step 443. In step 443, the migration advisor module 115 sends the virtual environment 108 to another network device 112 referred to herein as a "quarantine host" 112. The quarantine host 112 includes at least one storage medium configured to store information regarding the virtual environment 108, such as a copy or link to one or more components A-C of the virtual environment 108, to allow a subsequent migration request to be successfully completed. Alternatively, the quarantine host 112 can store a log accessible by the migration advisor module 115 and/or other software or hardware components coupled to the quarantine host 112 directly or via the network 104 to prevent future migration of the virtual environment 108. Then, the method 340 ends.

If the migration advisor module 115 determines in step 429 not to correct the migration incompatibility by changing a configuration of the virtual environment 108, the method 340 branches to step 443 discussed previously. Although the method 340 contemplates correcting the migration incompatibility by either performing the migration using a different target host or by changing a configuration of the virtual environment 108, a person of ordinary skill in the art having the benefit of the present disclosure will recognize that other approaches may be used to correct the migration incompatibility. For example, the migration incompatibility may be corrected by both performing the migration using a different target host and changing a configuration of the virtual environment 108, in accordance with certain exemplary embodiments.

If the migration advisor module 115 determines in step 405 not to seek operator assistance, the method 340 branches to step 421. In step 421, the migration advisor module 115 reads a rule regarding the procedure to use in addressing the incompatibility. In certain exemplary embodiments, the rule may be stored in a storage medium associated with the virtual environment 108, the migration advisor module 115, and/or one or more of the network devices 105 and 110-112. For example, the rule can indicate whether to address the incompatibility by using a different target host than Host B 110 and/or by changing a configuration of the virtual environment 108.

In step 423, the migration advisor module 115 determines, based on the rule read in step 421, whether to use a different target host than Host B 110 for the migration. If so, the method 340 continues to step 425. In step 425, the migration advisor module 115 identifies a new target host, such as Host C 111, with physical resources sufficient to meet the requirements of the virtual environment 108. The new target host can be any device or system configured to support a virtual environment. For example, the new target host can be a network device having a configuration similar to one or more of the network devices 105, 107, and 110-112. In certain exemplary embodiments, the migration advisor module 115 can identify the new target host based on information from a data repository, such as a database, associated or incorporated with one or more of the network devices 105, 107, and 110-112, and/or other devices, such as the new target host, coupled to the migration advisor module 115 directly or via the network 104.

In step 427, the migration advisor module 115 determines to complete the migration of the virtual environment 108 by migrating the virtual environment 108 from Host A 105 to the new target host identified in step 425. The method 340 continues to step 345 of FIG. 3.

If the migration advisor module 115 determines in step 423 not to correct the migration incompatibility by proposing a different target host than Host B 110, the method 340 branches to step 445. In step 445, the migration advisor module 115 determines whether to correct the migration incompatibility by changing a configuration of the virtual environment 108. If so, the method 340 continues to step 447.

In step 447, the migration advisor module 115 identifies each component A-C of the virtual environment 108. For example, the migration advisor module 115 (and/or one or more data collector components thereof) can identify the components A-C based on information from a data repository, such as a database, associated or incorporated with one or more of the network devices 105, 107, and 110-112. In step 449, the migration advisor module 115 identifies the physical system resources required by each component A-C of the virtual environment 108. For example, the migration advisor module 115 (and/or one or more data collector components thereof) can identify the physical system resources required by each component A-C based on information from a data repository, such as a database, associated or incorporated with one or more of the network devices 105, 107, and 110-112.

In step 451, the migration advisor module 115 identifies each component A-C that is not compatible with the physical system resources of Host B 1110. For example, the migration advisor module 115 can make this identification by comparing the physical system resource requirements identified in step 447 with the physical resources available in Host B 110, as identified in step 315 of FIG. 3.

The method 340 continues to step 439, in which the migration advisor module 115 determines whether the virtual environment 108 can run ok without the component(s) A-C identified in step 451. For example, the migration advisor module 115 can make this determination based on the relative importance of the identified component(s) A-C to the performance of the virtual environment 108. If the migration advisor module 115 determines in step 439 that the virtual environment 108 can run ok without the component(s) A-C, the method 340 continues to step 441, as described previously. If the migration advisor module 115 determines in step 439 that the virtual environment 108 cannot run ok without the component(s) A-C, the method 340 branches to step 443, as described previously.

If the module 115 determines in step 445 not to correct the migration incompatibility by changing a configuration of the virtual environment 108, the method 340 branches to step 443 discussed previously. Although the method 340 contemplates correcting the migration incompatibility by either performing the migration using a different target host or by changing a configuration of the virtual environment 108, a person of ordinary skill in the art having the benefit of the present disclosure will recognize that other approaches may be used to correct the migration incompatibility. For example, the migration incompatibility may be corrected by both performing the migration using a different target host and changing a configuration of the virtual environment 108, in accordance with certain exemplary embodiments.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for addressing migration incompatibility, comprising the steps of:

receiving information regarding a request to migrate a virtual environment ("VE") from a first host to a second host;

determining that the VE is incompatible with the second host because available physical system resources of the second host do not meet at least one physical system requirement of the VE;

determining whether to seek operator assistance to address the incompatibility;

in response to determining not to seek operator assistance:

determining, based on at least one rule, whether to address the incompatibility by one of (a) migrating the VE to a host that is not the second host, and (b) reconfiguring the VE, and automatically causing the VE to be migrated from the first host to a third host in response to determining, based on the at least one rule, to address the incompatibility by migrating the VE to a host that is not the second host, the third host having sufficient physical resources to meet the at least one physical system requirement of the VE, in response to determining, based on the at least one rule, to address the incompatibility by reconfiguring the VE automatically reconfiguring the VE by removing at least one unnecessary component from the VE, and causing the reconfigured VE to be migrated from the first host to the second host; and in response to determining to seek operator assistance:

outputting at least one request to an operator for an instruction on how to address the incompatibility, reading at least one instruction provided by the operator in response to the at least one request, and addressing the incompatibility, based on the at least one instruction, by one of (a) causing the VE to be migrated to a host that is not the second host, and (b) causing a reconfigured version of the VE to be migrated to the second host, a configuration of the reconfigured version of the VE being based on at least one input from the operator.

\* \* \* \* \*